Feb. 28, 1939.   W. BILINSKI   2,148,799
ARTIFICIAL BAIT
Filed April 28, 1937

Inventor
W. Bilinski

By Clarence A. O'Brien
Hyman Berman
Attorneys.

Patented Feb. 28, 1939

2,148,799

UNITED STATES PATENT OFFICE 2,148,799

ARTIFICIAL BAIT

William Bilinski, Dickson City, Pa.

Application April 28, 1937, Serial No. 139,628

2 Claims. (Cl. 43—48)

This invention appertains to new and useful improvements in artificial baits.

The principal object of the present invention is to provide artificial bait which will be more attractive and more durable than such baits now in general use.

Another important object of the invention is to provide a method of quickly and efficiently constructing artificial bait in a systematic manner.

These and various other important objects and advantages of the invention will become apparent to the reader of the following specification.

In the drawing:—

Figure 1:
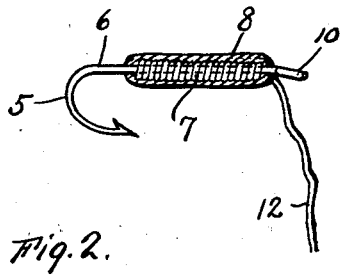
Figure 1 represents a side elevational view of a hook showing in section cord and shellac or cement applied.

Referring to the drawing wherein like numerals designate like parts, it can be seen in Figure 1 that a hook 5 is taken and on the shank 6 thereof is tightly wound the cord or twine 7. After this has been placed on the shank, an application of cement or like material 8 is given to the wound twine.

Figure 2:
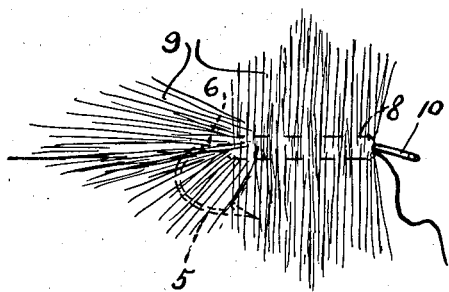
Figure 2 is a side elevational view of the structure with the deer hair applied and before trimming.

Deer hair 9 is now wound over the soft cement covered twine in the manner suggested in Figure 2.

The partly prepared bait is now placed in a machine for cutting and trimming. Obviously, when the deer hair is applied part of the deer hair will adhere because it will become embedded in the cement.

Figure 3:
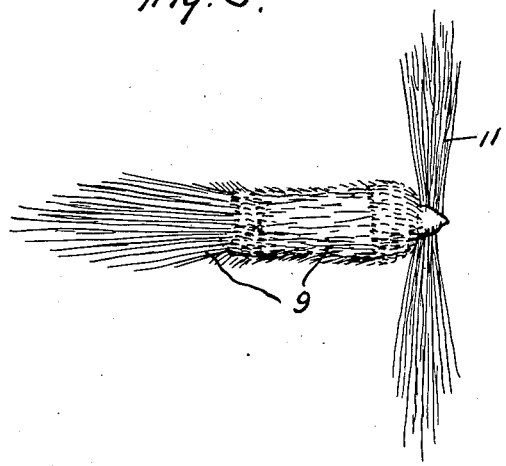
Figure 3 is a top plan view of the bait finished.
Figure 4:
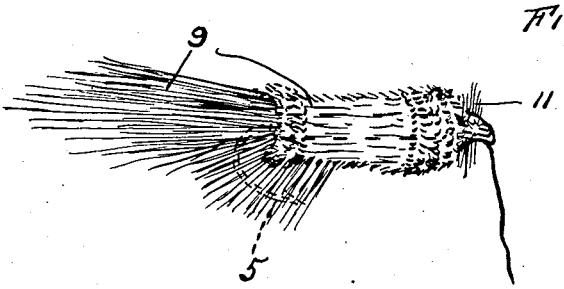
Figure 4 is a side elevational view of the bait finished.

The cutting and trimming prepares the bait as shown in Figures 3 and 4, and additional strands of the hair 11 can be arranged transversely at the front of the bait and secured at the eye 10 by utilizing the free end of the twine 12 for this purpose, or may be secured in any other suitable manner to form wing members of said transversely disposed hairs.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. A method of constructing artificial bait consisting in wrapping the shank of a hook with twine, applying an adhesive substance over the wound twine, loosely winding hair over the adhesive twine winding before the adhesive hardens, to cause part of the hair to be embedded in the adhesive, the ends of certain of said hairs remaining free, so that the end portions thereof will project outwardly, said hairs including a group at the rear of the hook extending substantially longitudinally of the shank and a group wrapped transversely around said shank and covering the front ends of said first group.

2. A method of constructing artificial bait consisting in wrapping the shank of a hook with twine inwardly of the eye of the hook, applying an adhesive substance over the wound twine, loosely winding deer hair over the adhesive twine winding before the adhesive hardens, to cause part of the hair to be embedded in the adhesive, the ends of certain of said hairs remaining free, so that the end portions thereof will project outwardly, said hairs including a group at the rear of the hook extending substantially longitudinally of the shank and a group wrapped transversely around said shank and covering the front ends of said first group and securing additional hairs transversely at the front of the hook adjacent said eye.

WILLIAM BILINSKI.